3,518,404
WELDING WIRE FOR ELECTRIC ARC-WELDING
IN AIR
Karel Christiaan ter Haar, Utrecht, Netherlands, assignor, by mesne assignments, to U.S. Philips Co., Inc., New York, N.Y., a corporation of Delaware
No Drawing. Filed July 22, 1968, Ser. No. 746,291
Claims priority, application Netherlands, July 20, 1967, 6710039
Int. Cl. B23k 35/22
U.S. Cl. 219—146      2 Claims

ABSTRACT OF THE DISCLOSURE

Electrode for use in electric arc welding in air without the use of a protective gas atmosphere. The electrode is in the form of a tubular iron shell having a core of slag-forming materials comprising calcium fluoride, titanium dioxide, potash feldspar and ferrotitanium and metal powder.

---

The invention relates to a bare electrode for electric arc-welding in air and to a method in which such an electrode is used.

One of the problems arising in electric arc-welding consists in the porosity of the weld. Various solutions of this problem have been proposed. For this purpose, a protective gas atmosphere is used in electric arc-welding by means of a bare electrode—which is to be understood herein to mean an electrode not coated with slag-forming and other constitutents—which may consist of solid metal or of a metal shell and a core containing inter alia slag-forming constituents. This has the disadvantage that the protective gas must be supplied separately (in cylinders) and that steps must be taken for supplying the protective gas to the welding arc and to the welding area.

The invention has for an object to provide a method which is simpler and more economical and which does not require the use of a protective gas. The welding process is carried out in air.

This object has been attained by means of a welding electrode (welding wire) consisting of a tubular shell on the basis of iron and a core of an accurately defined composition.

The invention relates to a welding electrode for electric arc-welding in air consisting of a tubular shell on the basis of iron and a core of slag-forming constituents and metal powder and it is characterised in that the quantity of slag-forming constituents is 6 to 15% by weight of the welding electrode and consists of 5.2 to 7.4 parts by weight of calcium fluoride, 1.5 to 3.0 parts by weight of titanium dioxide and 0.4 to 0.8 parts by weight of potash feldspar, the core further containing 3.5 to 5.5 parts by weight of ferrotitanium with 15 to 25% by weight of titanium.

The invention further relates to a method of electric arc-welding in air, in which this electrode is used.

It has been found that the electrode in accordance with the invention is particularly suitable for applying wear-resistant layers. Surprisingly, it has been found that a large part of the titanium and carbon of the electrode gets into the weld material. The large hardness and high resistance to wear of the weld metal are due to this fact.

Besides the said characteristic constituents, the core of the electrode may contain powdered iron, alloying metals, for example, chromium or nickel, ferromanganese, silicon carbide and carbon. The quantities of these materials may be adapted in known manner to the requirements to be imposed on the weld metal.

The invention will be described more fully with reference to the following examples.

A welding wire (2.4 mm. in diameter) of the following composition was used for hard surfacing:

Core:
    Calcium fluoride _____ 5.5
    Titanium dioxide _____ 1.5
    Potash feldspar _____ 0.5
    Ferrotitanium (containing 20% by weight of Ti) _____ 4.6
    Ferromanganese (containing 80% by weight of Mn) _____ 0.5
    Iron powder _____ 24.4
Shell:
    Soft steel _____ 63.0

Like in the following example, the contents are expressed in percent by weight of the welding wire.

In some experiments, direct current is used for welding and in others alternating current. The current intensities were 300 to 600 a.; the welding voltage was 28 to 34 v. The projecting length of the wire was 20 to 30 mm.

It was found that the weld metal contained 0.07% of C; 0.036% of N; 0.55% of Ti; 0.20% of Si and 0.60% of Mn (percent by weight). The hardness of the weld metal was: Brinell 275. (Such a steel not containing titanium has a considerably smaller hardness.)

In a second example, the welding wire (2.4 mm. diameter) had the following composition (in percent by weight of the wire):

Core:
    Calcium fluoride _____ 5.5
    Titanium dioxide _____ 1.5
    Potash feldspar _____ 0.5
    Ferrotitanium (containing 20% by weight of Ti) _____ 4.6
    Ferromanganese (containing 80% by weight of Mn) _____ 0.5
    Ferromolybdenum (containing 70% by weight of Mo) _____ 1.5
    Ferrochromium (containing 70% by weight of Cr and 7% by weight of C) _____ 7.2
    Iron powder _____ 15.7
Shell:
    Soft steel _____ 63.0

The Vickers hardness of the weld metal was 590 to 700. In both examples, a surprisingly small quantity of the added carbon and alloying elements had been burnt off. In the second example, in which the total carbon content of the welding wire was 0.60% by weight, the weld metal contained 0.50% by weight of carbon. The titanium content of the welding wire was 0.93% by weight; that of the weld metal 0.53% by weight.

In another example, the carbon content of the wire was 0.72% by weight, that of the welding metal 0.56% by weight.

The welding wire in accordance with the invention is particularly suitable to be used for automatic and semi-automatic electric arc-welding in air. It has been found that the weld metal does not become porous during welding even if the arc is exposed to a side-wind. Spattering is substantially completely avoided during welding. Welds of very smooth outer appearance can be obtained. The slag layer can be readily removed. It is also important that the welding electrode in accordance with the invention permits of using alternating current for welding.

What is claimed is:

1. A welding electrode for electric arc-welding in air consisting of a tubular shell on the basis of iron and a core of slag-forming constituents and metal powder, characterized in that the quantity of slag-forming constituents is 6 to 15% by weight of the welding electrode and consists of 5.2 to 7.4 parts by weight of calcium fluoride, 1.5 to 3.0 parts by weight of titanium dioxide and 0.4 to 0.8 parts by weight of potash feldspar, the core further containing 3.5 to 5.5 parts by weight of ferrotitanium with 15 to 25% by weight of titanium.

2. The welding electrode of claim 1 wherein the metal powder consists essentially of iron.

References Cited

UNITED STATES PATENTS

| 2,422,489 | 6/1947 | Kihlgren et al. | 117—207 |
| 3,221,136 | 11/1965 | Freeth et al. | 219—146 |

JOSEPH V. TRUHE, Primary Examiner

L. A. ROUSE, Assistant Examiner